(12) United States Patent
Goeddel

(10) Patent No.: US 6,757,547 B1
(45) Date of Patent: Jun. 29, 2004

(54) METHODS AND DEVICES FOR IMPROVING THE PERFORMANCE OF WIRELESS DEVICES USING SPEED AND NOISE METRICS

(75) Inventor: Thomas W. Goeddel, Fair Haven, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/565,388

(22) Filed: May 5, 2000

(51) Int. Cl.$^7$ ............................................... H04B 7/005
(52) U.S. Cl. ....................................... 455/504; 375/227
(58) Field of Search ............................... 455/67.1, 67.3, 455/67.4, 423, 424, 425, 504, 505, 506, 10; 375/224, 227

(56) References Cited

U.S. PATENT DOCUMENTS

| | | | |
|---|---|---|---|
| 6,208,617 B1 | * | 3/2001 | Rupp ........................... 370/216 |
| 6,389,084 B1 | * | 5/2002 | Rupp ........................... 375/343 |
| 6,430,235 B1 | * | 8/2002 | O'Shea et al. ............... 375/326 |

* cited by examiner

Primary Examiner—Nay Maung
Assistant Examiner—Tu Nguyen (57) ABSTRACT

The performance of wireless devices is improved using methods and devices which comprise novel SPEED and NOISE metrics. The SPEED metric is generated from a mean value of a differential signal while the NOISE metric is generated from a variance value of a differential signal. The generation of both metrics assumes the use of a limited number of symbols used to generate the mean and variance values. One example of a signal used to generate the metrics comprises the 14 synchronization symbols which make up part of an IS-136 standard signal. The SPEED metric was discovered to comprise a value which is equal to the magnitude of the mean value of the differential signal while the NOISE metric was discovered to comprise a value which is approximately equal to twice the variance of noise in a received baseband signal, while at the same time being independent of the speed at which an object, such as a wireless device, moves. In the case where a Least Mean Square ("LMS") method is used to estimate channel fading in a flat-faded channel, it was discovered that the logarithm of a ratio of the SPEED metric to the NOISE metric as plotted against optimum step sizes is a substantially linear relationship.

54 Claims, 4 Drawing Sheets

METHODS AND DEVICES FOR IMPROVING THE PERFORMANCE OF WIRELESS DEVICES USING SPEED AND NOISE METRICS

BACKGROUND OF THE INVENTION

Anyone who has used a cellular telephone or another type of wireless device is familiar with the occasional "hiccups" which occur in the reception of voice, data or video information. Many of these are due to a loss of signal, others are due to increased bit error rates (abbreviated "BER"), which results in reduced voice quality or lower data throughputs. Generally, a wireless communication signal is transmitted to and from a moving object, such as a wireless device, to a fixed transceiver or the like through space. This space is known as the "channel" through which the signal travels. One important measurement when it comes to the transmission of digital information through a channel is the BER of the channel. A channel which has a high BER is undesirable.

There exists a number of ways to minimize the BER of a channel. One way is to improve the way that a received signal is processed in order to extract original data embedded within an original, transmitted signal. That is, instead of changing the channel itself (which is many times impractical to do), the method used to generate the received signal from the transmitted signal may be improved. Many methods for generating a received signal from a transmitted signal rely on information related to the speed of the moving object and the amount of noise in the channel. For example, the object's speed is related to a characteristic called "channel fading". Some methods for generating a received signal involve estimating the affects of channel fading. It has been recognized that the BER of a channel can be reduced or minimized if a transceiver within a wireless device is provided with information about channel fading. In other words, if a transceiver is supplied with information which describes how errors were introduced into the signal by channel fading, then the transceiver can be adapted to correct these errors.

Because the speed of an object and the amount of noise in the channel affects a signal traveling through the channel it becomes important to estimate these affects. To date, there has been no easy way to estimate the speed of a wireless device or the noise in the channel from a received version of the signal.

Such estimates, if reliable, could be used to reduce the BER of a signal and thus improve the performance of wireless devices.

Accordingly, it is desirable to provide for methods and devices for improving the performance of wireless devices.

It is also desirable to provide for methods and devices for improving the performance of wireless devices using information about an object's speed and the amount of noise present in a transmission channel.

Other objectives, features and advantages of the present invention will become apparent to those skilled in the art from the following description taken in conjunction with the accompanying drawings.

SUMMARY OF THE INVENTION

In accordance with the present invention there are provided methods and devices for improving the performance of a wireless device. As envisioned by the present inventor the present invention comprises methods and devices for generating a SPEED metric from a mean value of a differential signal and generating a NOISE metric from a variance value of the differential signal. One or both metrics may be generated in this manner provided the number of symbols used to generate the mean and variance values is a limited number of symbols.

Two examples of devices envisioned by the present invention are an arithmetic logic unit ("ALU") and a wireless device comprising an ALU.

In the novel methods and devices, the SPEED metric comprises a value which is: the square of the absolute value of the magnitude of the mean value of the differential signal; or the magnitude of the mean value of a differential signal; or the square root of the magnitude of the mean value of a differential signal.

The NOISE metric comprises the variance of the differential signal which is shown to be approximately equal to twice the variance of the noise in a received baseband signal while at the same time being independent of the speed at which an object, such as a wireless device, moves.

As envisioned by the present inventor, the novel methods and devices can be adapted to generate an optimum Least Mean Square ("LMS") step size for use in channel estimates which bears a substantially linear relationship to a logarithm of a ratio of a SPEED metric to a NOISE metric.

The present invention and its advantages can be best understood with reference to the drawings, detailed description of the preferred embodiments and claims that follow.

DETAILED DESCRIPTION OF THE INVENTION

Figure 1:
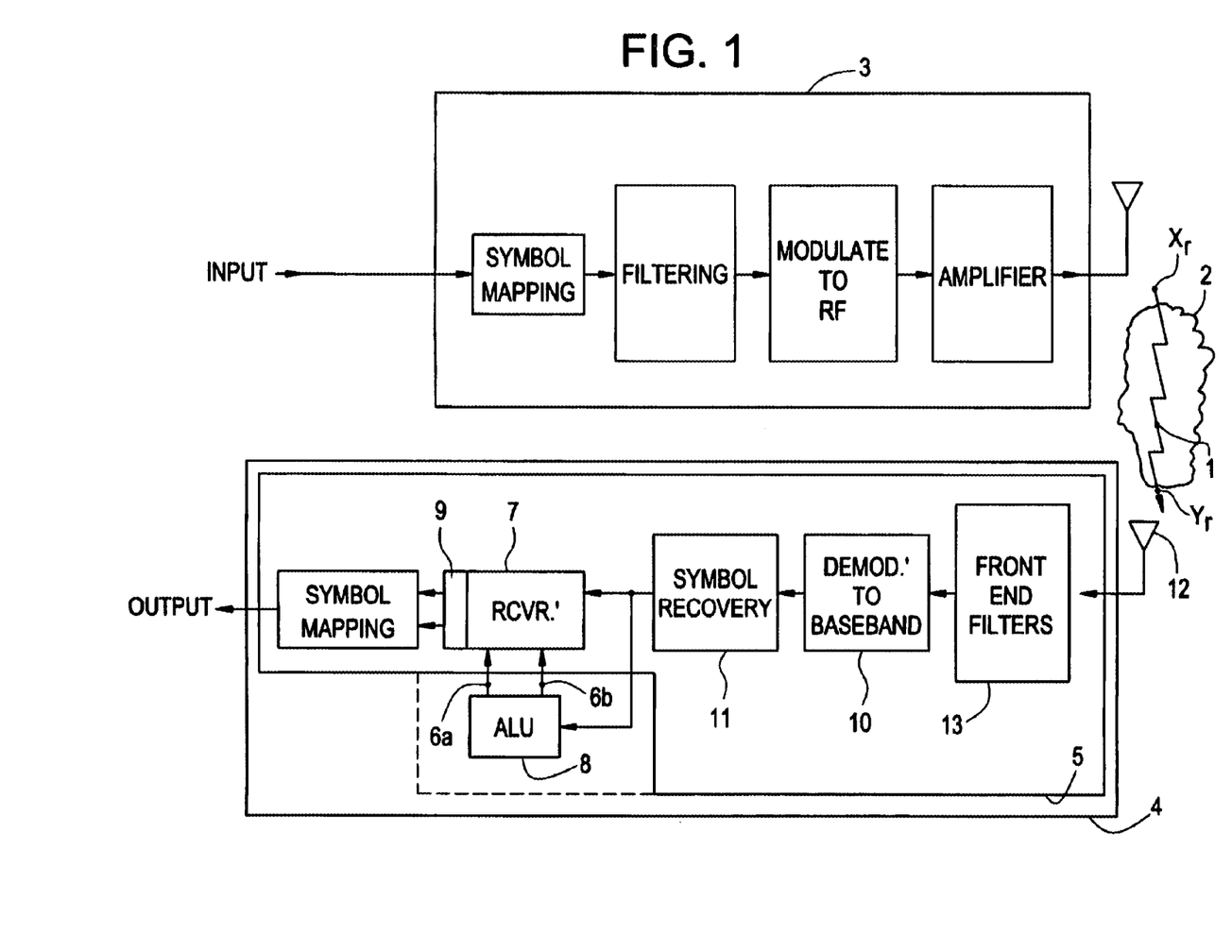
FIG. 1 depicts a moving object, such as a wireless device, and a wireless communications base station which operate in accordance with one embodiment of the preset invention.

Referring to FIG. 1, a signal 1 is shown traveling within a transmission channel 2 located between a moving object 3 and base station 4. In an illustrative embodiment of the present invention, the base station 4 comprises a fixed or stationary base station though the present invention applies equally well to a movable base station. More specifically, base station 4 comprises a first wireless communications transceiver 5 or the like while the moving object 3 comprises a second wireless communications transceiver (not shown).

It should be understood that over time the object 3 moves from one position to another. In addition, it should be further understood that the signal 1 in reality comprises a number of signals. For example, at the instant the signal 1 is transmitted it comprises transmission signal $x_r$. When it has traveled through channel 2 the signal 1 comprises received signal $y_r$. Within base station 4 is the first transceiver or transceiving means 5.

Transceiver 5 comprises both transmission and reception sections (i.e., at least one transmitter and one receiver). The present invention focuses on reception means or receiver 7. In addition, the transceiver 5 comprises ALU or ALU means 8. The receiver 7 and ALU 8 are adapted to extract data from signal 1 and convert the data into a form which matches the original data transmitted from object 3, for example. In reality, this is next to impossible to achieve. Instead, receiver 7 and ALU 8 are adapted to generate a signal which is a close approximation (hereafter sometimes referred to as a "regenerated signal") of the transmission signal $x_r$. To be of any practical use, the regenerated signal must contain substantially the same information as the original signal, $x_r$.

Backtracking a bit, it should be understood that the received signal $y_r$ is not identical to the transmission signal $x_r$. That is, the original transmission signal $x_r$ changes as it travels through the channel 2. To produce a regenerated signal which comprises a close approximation of the original transmission signal $x_r$, the transceiver 5 can be adapted to convert received signal $y_r$ into a close approximation of transmission signal $x_r$. The transceiver 5 is adapted to at least "reduce" any errors introduced into the transmission signal $x_r$ by channel 2. Said another way, the transceiver 5 is adapted to minimize or otherwise reduce the BER of signal 1. The transceiver 5 is adapted to reduce the errors introduced into transmission signal $x_r$ in a number of different ways. For example, transceiver 5 may be adapted to carry out Least-Mean-Square ("LMS") estimations of the variations in channel 2 to name just one example. These estimations can then be used to remove any errors. Many of the methods, including the LMS method, used by transceivers to reduce errors using a received signal would be more accurate if information about the speed of a moving object and/or the amount of noise present in channel 2 could be derived from the received signal. In an illustrative embodiment of the present invention, ALU 8 is adapted to provide this information in the form of SPEED and NOISE metrics.

It should be understood that although the discussion above uses a transceiver 5 located at base station 4 both the object 3 and base station 4 comprise transceivers. In the discussion and claims which follow, the word "transceiver" means a transceiver which is a part of base station 4 or object 3. To simplify the explanation which follows, it is suitable to deal with a stationary transceiver 5 though the invention applies equally to a transceiver which is a part of a moving object (e.g., wireless telephone) or moving base station.

In an illustrative embodiment of the present invention, prior to regenerating original signal $x_r$ from received signal $y_r$, ALU 8 is adapted to generate a SPEED metric and a NOISE metric. As will be explained below, the SPEED and NOISE metrics improve the receiver's 7 ability to correct errors. Once these metrics are derived, the ALU 8 is adapted to send them to the receiver 7 which is then adapted to regenerate the original signal $x_r$ using the metrics supplied by ALU 8. Though the receiver 7 and ALU 8 are shown as two separate blocks in FIG. 1 it should be understood that the invention is not so limited. The receiver 7 and ALU 8 may be combined into one unit or further broken down into additional units. Similarly, the base station 4 may be thought of as comprising a wireless device which in turn comprises one or both of receiver 7 and ALU 8. When ALU 8 is separate from receiver 7 it may be referred to as an "ALU device", and may comprise a digital signal processor, microprocessor or some combination of logic and memory devices.

As envisioned by the present invention, the SPEED metric is a value (e.g., a number) which reflects how quickly the channel 2 changes. It should be understood that this SPEED metric does not give an exact indication of how fast an object is moving. Instead, the SPEED metric provides a relative or close approximation of how fast a channel changes. In a sense the SPEED metric indicates the rate at which the channel changes over time. Even though the SPEED metric does not give an exact indication of how fast an object is moving it is still very useful. One reason for this is that there is a close correlation between the speed of an object and signal "fading". That is, it has been observed that a transmission signal $x_r$ will appear to change depending on the speed at which the object emitting the signal (or base station) is moving. This fading is referred to as "channel fading".

Before delving into an explanation of how the present inventor discovered SPEED and NOISE metrics, some additional introductory comments may prove helpful.

It will be assumed that the signal 1 comprises a complex, Quadrature Amplitude Modulated ("QAM") signal, such as an M-PSK modulated signal. The signal 1 further comprises samples of data which may or may not be differentially encoded. In an illustrative embodiment of the present invention, each sample comprises two data bits. These data bits are mapped or otherwise inserted within signal 1 as complex "symbols", $x_k$. For example, if signal 1 comprises a 4-PSK modulated signal then wireless device 3 is adapted to insert or otherwise embed a symbol representing the first two data bits into signal 1 at any one of 4 different signal phases which can be represented as degrees, namely, 0 degrees, 90 degrees, 180 degrees and 270. After the first set of data bits has been so inserted, each additional set of data bits will then be embedded using the same technique. It is further assumed that the symbols selected to represent the data bits were drawn from a set of symbols and that this set of symbols is known at (or by) the wireless device 3 and base station 4. For example, the symbols may comprise the symbols used in the IS-136 standard. It will also be assumed that the channel 2 comprises a flat-fading channel.

As envisioned by the present inventor, SPEED and NOISE metrics can be derived by taking advantage of the fact that some of the symbols are known by both the wireless device 3 and base station 4 (i.e., transceiver 5).

To explain further, generally speaking, signal 1 can be broken down into content and synchronization data. The former is unknown by transceiver 5 while the latter is known. Within the IS-136 standard, for example, there are 14 synchronization symbols out of a possible 162 symbols. The other 148 symbols are used to represent content and to carry out control/security functions as well as other functions. In an illustrative embodiment of the present invention, the 14 synchronization symbols ("sync symbols") are known by the wireless device 3 and base station 4.

From this point on, when the terms "data" or "symbol" are used they refer to sync symbols or sync data.

It should be understood that, prior to reaching the receiver 7 or ALU 8, signal 1 has undergone demodulation from radio frequencies to baseband frequencies using components 10, 11 and 13 shown in FIG. 1. Such components are known by those skilled in the art.

Continuing, a model for the received signal $y_r$ is given by:

$$y_k = h_k x_k + n_k, k=0, \ldots, N \qquad (1)$$

where $y_k$ is the k-th received complex baseband sample derived from received signal $y_r$, $h_k$ is the complex channel value (sometimes referred to as "channel fading value") for the flat fading channel 2, $x_k$ is the assumed-known transmitted symbol or "sync" symbol, and $n_k$ is zero-mean white Gaussian noise with variance $\sigma^2_n$ (sometimes referred to as "channel noise"). In an illustrative embodiment of the present invention, because signal 1 comprises an M-PSK signal the transmitted symbols are assumed to be $|x_k|=1$ for all k samples. That is, the mathematical "constellation" points (representing the location of symbols $x_k$) embedded within M-PSK signal 1 all fall on a representative, mathematical unit circle in a mathematical complex plane.

By including the channel fading value and channel noise, Equation (1) takes into account the effects of both flat-fading and noise. Because, as mentioned above, channel fading is related to the speed of a moving object, Equation (1) can be used as a starting point in the derivation of SPEED and NOISE metrics. If the channel fading contribution, $h_k$, and channel noise contribution, $n_k$, are eliminated from Equation (1) then the received symbols will exactly match the transmitted symbols.

In any event, once the symbols are received by transceiver 5, the transceiver is adapted to estimate the original transmitted symbols, $x_k$. The transceiver 5 is then further adapted to generate the original bits from these symbol estimates.

To further simplify the discussion which follows, it will be assumed that the transceiver 5 comprises a single antenna 12 (i.e., no spatial diversity). It should be understood, however, that the present invention envisions methods and devices which comprise or utilize multiple antennas as well.

In an illustrative embodiment of the present invention, to derive SPEED and NOISE metrics from Equation (1), any data modulation (as opposed to RF modulation which has previously been removed) must first be removed from the received sampled signal, $y_k$. It should be understood that the term "$y_k$" will be used to mean either an entire received, sampled signal 1 or an individual sample within the entire signal 1 depending on the context of the discussion.

In an illustrative embodiment of the invention, the ALU 8 is adapted to multiply baseband received signal $y_k$ by the complex conjugate of the known transmission signal $x_k$, or:

$$z_k = y_k x_k^* \quad (2)$$

to yield:

$$z_k = h_k + \tilde{n}_k \quad (3)$$

when $|x_k|=1$ for a M-PSK signal. It may be of help to envision equation (3) as being derived by substituting the terms on the right side of equation (1) representing the received signal $y_k$ into equation (2) in place of $y_k$. In Equation (3), the value $\tilde{n}_k$ is a white Gaussian noise process with variance $\sigma^2_n$. In effect, Equation (3) represents a received baseband signal stripped of the effects of data modulation.

Next, ALU 8 is adapted to generate a "differential" signal, $z_k'$, given by:

$$z_k' = z_k - z_{k-1}, k=1, \ldots, N \quad (4)$$

Again, it may aid the reader to envision Equation (4) as $$z_k' = h_k' + n_k' \quad (5)$$

where $$h_k' = h_k - h_{k-1} \quad (6)$$

and $$n_k' = \tilde{n}_k - \tilde{n}_{k-1} \quad (7)$$

Because noise is present within channel 2, the present invention envisions an ALU 8 which is adapted to average the complex vector differences over different signal $z_k'$. By so doing, the zero-mean noise contributions from the channel 2 average out to zero, reducing the effects of noise. In an illustrative embodiment of the invention, ALU 8 is adapted to carry out this averaging over a limited number of symbols to avoid introducing errors due to changes in the direction of $h_k'$.

Referring back to equation (5), it can be seen that the differential signal can be envisioned as comprising both noise, $n_k'$, and speed (fading), $h_k'$. In order to generate a SPEED metric the noise component should be minimized. Likewise, in order to generate a NOISE metric the fading component should be minimized.

In an illustrative embodiment of the present invention, ALU 8 is adapted to generate a SPEED metric from the sample mean value of the differential signal $z_k'$ and a NOISE metric from a variance value of the differential signal, as in:

$$\bar{z}' = 1/N \sum_{k=1}^{N} z_k' \text{ and} \quad (8)$$

$$\sigma^{2'}_z = 1/N \sum_{k=1}^{N} |z_k'|^2 - |\bar{z}'|^2 \quad (9)$$

To be useful, a metric must be understood. With this in mind the present inventor realized that the mean value of the differential signal $z_k'$ given by equation (8) could be further expanded upon as follows. Mathematically, $z_k'$ can be replaced in equation (8) with the terms $h_k' + n_k'$ as given by equation (5). Further, because the transceiver 5 knows that the original transmitted signal 1 comprises a limited number of symbols, each of which is being transmitted as often as the other, the differential noise term $n_k'$ comprises a zero mean, enabling equation (8) to be mathematically reduced to:

$$\bar{z}' \approx \bar{h}' \quad (10)$$

which is the average symbol-to-symbol channel movement. That is, equation (10) gives an indication of how fast the characteristics of the channel 2 are changing as the wireless device or object 3 moves causing the signal 1 to traverse different parts of the channel 2. In one embodiment of the present invention, the "speed" or rate at which the characteristics of the channel 2 are changing is related to the speed at which the object 3 is moving. Overly simplified, it can be said that the faster the object 3 moves, the greater the rate of change in the channel characteristics and vice-versa.

It was recognized by the present inventor that equation (10) could be further simplified by assuming that, if the number of symbols included within the mean calculation was kept relatively small, then the change or variation in the directional component would be relatively small and, therefore, could be effectively ignored. That is, if a small number of symbols is used to calculate the mean it is reasonable to assume that the directional component would be negligible because, in most cases, the signal 1 does not undergo drastic changes due to variations in the channel 2. It is only over the entire length of the signal 1 that such changes become noticeable. This leads to the conclusion that the magnitude of the mean value of signal z' substantially reflects the magnitude of the change in channel variations from symbol-to-adjacent-symbol. Said another way, the magnitude of the mean value of signal z' can be used as a SPEED metric once the directional component of z' is eliminated. In an illustrative embodiment of the invention, ALU 8 is adapted to generate a SPEED metric, $S_m$, defined as:

$$S_m = |\bar{z}'|^2 \tag{11}$$

In other illustrative embodiments of the invention, ALU 8 is adapted to generate the SPEED metric, $S_m$, defined as the magnitude of the mean value of the differential signal z' or as the square root of the magnitude of the mean value of the differential signal. It should be understood that the SPEED metric gives a relative indication of the speed. This is due to the fact that under equivalent noise conditions $S_m$ will be larger at higher speeds than lower speeds.

Having discovered a SPEED metric, the present inventor turned his attention to the discovery of a NOISE metric. As it turns out, the number of symbols is also important to the discovery of a NOISE metric. As stated above, the discovery of a SPEED metric was made possible by using a relatively small number of symbols in order to minimize the directional variation in differential channel vectors. On the other hand, to minimize the effects of noise on the SPEED metric, the larger the number of symbols the better. In an illustrative embodiment of the present invention, the present inventor realized that the discovery of both SPEED and NOISE metrics required the use of symbols whose total number was not so high as to render the SPEED metric invalid, but not so low as to frustrate the discovery of a NOISE metric. In an illustrative embodiment of the present invention, the number of symbols used to determine the SPEED metric will be limited at the upper end by the number of known symbols that are available. As it turns out, the number of symbols which satisfies both conditions still comprises a relatively small number of symbols. To distinguish the number of symbols used to satisfy both metrics from the number needed to satisfy each metric individually, the number which satisfies both will be referred to as a "limited" number of symbols.

For example, if signal 1 comprises a signal based on an IS-136 standard then the ALU 8 is adapted to generate SPEED and NOISE metrics using the 14 synchronization symbols making up that standard. The use of a limited number of symbols allows both SPEED and NOISE metrics to be defined.

In an illustrative embodiment of the present invention, a NOISE metric comprises the variance measurement given by equation (9). The present inventor realized that equation (9) could be further expanded upon to yield a relationship where the NOISE metric is related to noise in the channel 2. In an illustrative embodiment, if noise in the channel 2 can be assumed to be statistically independent of channel fading then the variance $\sigma^2_{z'}$ comprises two components and can be further defined as:

$$\sigma^2_{z'} = \sigma^2_{h'} + \sigma^2_{n'} \tag{12}$$

where $\sigma^2_{h'}$ is the variance of the differential channel samples and $\sigma^2_{n'}$ is the variance of the differential noise samples. The inventor then recognized that as long as an appropriate number of symbols is utilized to calculate the variance and, similar to before, a relatively small number of symbols are used in the variance calculation, $\sigma^2_{h'}$ comprises a value approximately equal to zero. This allows equation (12) to be simplified resulting in the following relationship:

$$\sigma^2_{z'} \approx \sigma^2_{n'} \tag{13}$$

Because the differential noise variance $\sigma^2_{n'}$ can be represented as the difference between two independent noise samples each with variance, $\sigma^2_n$ equation (13) can be rewritten in terms of the original noise variance as $$\sigma^2_{z'} = 2\sigma^2_n \tag{14}$$

This led the present inventor to the discovery that the variance of the differential signal should be approximately equal to 2 times the original noise variance of a baseband received signal. In an illustrative embodiment of the present invention, the variance in equation (9) can be used as a noise metric, $N_m$, given by:

$$N_m = \sigma^2_{z'} \tag{15}$$

Thus, ALU 8 can be adapted to regenerate original signal $x_r$ using noise metric $N_m$.

It should be noted that the SPEED metric $S_m$ given by equation (11) assumes that the symbol-to-adjacent symbol differential noise component symbol, $n'_k$, could be effectively ignored. But, it was not assumed that the noise component from the beginning to the end of signal 1 was zero. In an alternative embodiment of the present invention, just such an assumption is made. If the noise component over the entire length of signal 1 or over a substantially long segment of signal 1 is close to zero, then ALU 8 can be adapted to use a SPEED metric $S_m$ defined as the mean of the magnitude of the $z'_k$ symbol values.

Figure 2:
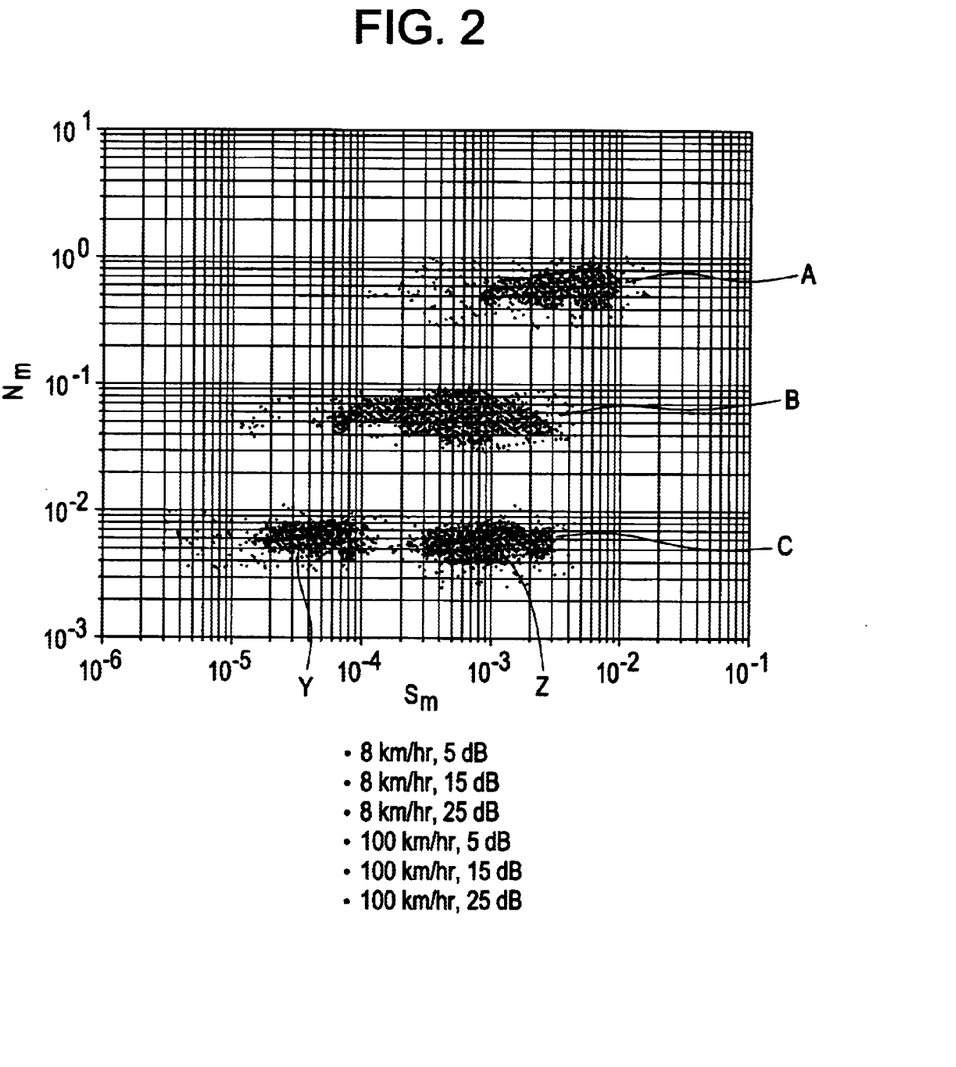
FIG. 2 depicts a scatter plot of a NOISE metric versus a SPEED metric according to one embodiment of the present invention.

FIG. 2 shows a scatter plot of the NOISE metric (vertical axis) versus the SPEED metric (horizontal axis) according to an embodiment of the present invention. The NOISE and SPEED metrics are plotted as a function of two different speeds (8 and 100 km/hr) and 3 different signal-to-noise ratios ("SNR") (5, 15 and 25 dB). Looking at FIG. 2, there are three regions, A, B and C which relate to the noise metric, $N_m$, along the vertical axis and two clusters, Y and Z, that relate to the speed metric $S_m$. FIG. 2 can be interpreted as follows. Level C reflects a SNR of 25 db (low noise), level B an SNR of 15 db (some noise) and level A an SNR of 5 db (high noise). Within level C are two noticeable clusters Y and Z. As the noise increases from level C to B and from B to A these two clusters converge. In the example shown in FIG. 2, cluster Y relates to a speed of 8 km/h while cluster Z relates to a speed of 100 km/h.

The signals plotted used the IS-136 frame at 1.9 GHz, a Rayleigh flat-fading channel model known in the art and two antenna diversities with the metrics from the two antennas averaged together. The metrics were computed using the 14 known IS-136 sync symbols.

Based on FIG. 2, the present inventor discovered that the ALU 8 could be adapted to use a NOISE metric which is independent of an object's speed. The absolute value of the NOISE metric compares favorably with the expected value of the noise variance. For example, twice the noise variance at an SNR of 25 dB matches the vertical center of the cluster of points given by cluster Y and Z.

Figure 3:
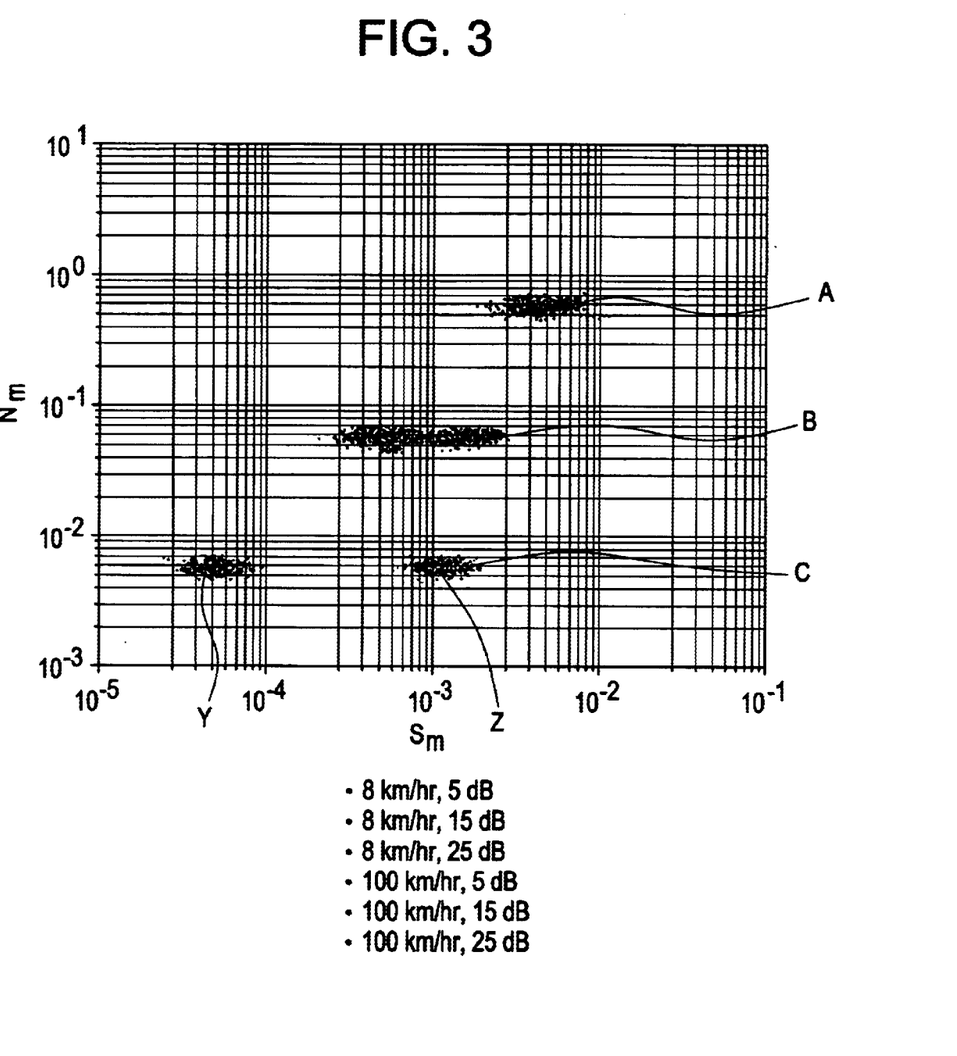
FIG. 3 depicts a scatter plot similar to the plot in FIG. 2 having a first order recursive smoothing filter applied according to another embodiment of the present invention.

FIG. 3 depicts the same data as in FIG. 2, except that the transceiver 5 now comprises a simple, first order recursive smoothing filter or means 9. In an alternative embodiment, transceiver 5 is adapted to apply filter 9 to the metrics computed in successive frames because, in practice, speed and noise conditions change relatively slowly from frame to frame making tracking a relatively straightforward matter. The filter 9 can be defined by $$\overline{M}_{k+1} = \eta \overline{M}_k + (1-\eta) M_k \tag{16}$$

where $M_k$ is the instantaneous NOISE or SPEED metric, $\overline{M}_k$ is the smoothed version of the metric, and $\eta$ is the filter coefficient. In an illustrative embodiment of the present invention, a value of η=0.8 can be used. FIG. 3 shows that the variance of the metrics can be considerably reduced.

As mentioned above, when the LMS algorithm is used for channel estimation, it is desirable to use an optimum step size for each change in an object's speed and each change in the amount of noise in the channel. In general, higher speeds or lower noise conditions dictate larger step sizes, while higher noise or lower speed conditions dictate smaller step sizes. Realizing this, the present inventor discovered that there exists a relationship between the SPEED and NOISE metrics which can be used to define a "combined" metric. This combined metric can be used regardless of the speed of the object or noise condition of the channel. More precisely, the present inventor discovered that the logarithm of the ratio of the SPEED metric to the NOISE metric has a substantially linear relationship to the optimum LMS step size. This combined metric "M" is given by:

$$M = \log(S_m/N_m) = \log(S_m) - \log(N_m) \quad (17)$$

In one embodiment of the invention, ALU 8 is adapted to supply a NOISE metric and SPEED metric to receiver 7. Receiver 7 is then adapted to select an optimum LMS step size using combined metric M.

Figure 4:
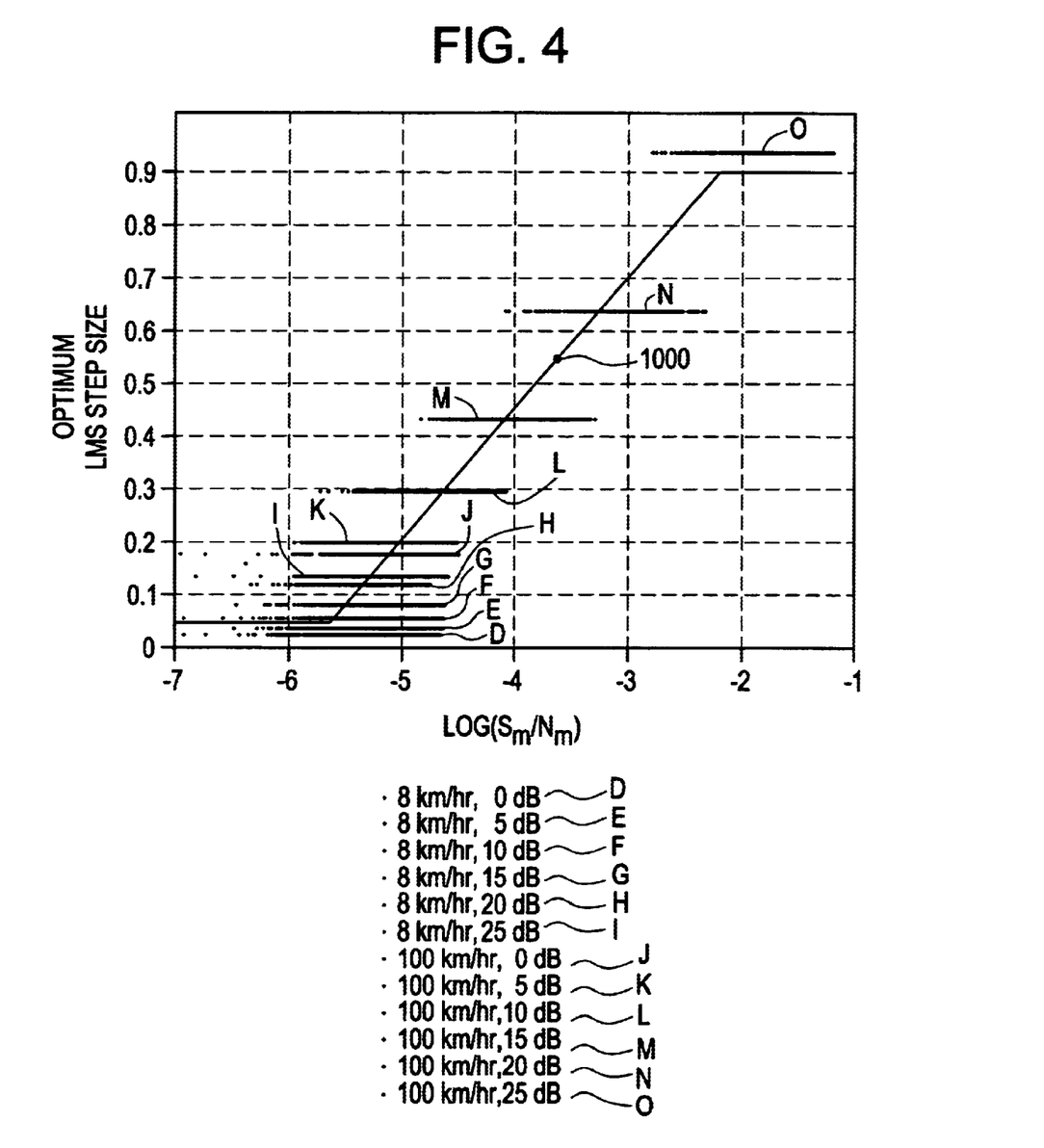
FIG. 4 depicts a graph of optimum LMS step size versus the logarithm of the ratio of a SPEED metric to a NOISE metric according to one embodiment of the present invention.

FIG. 4 depicts a plot of "M" (horizontal axis) versus the optimum LMS step size (vertical axis) for a number of different speed and noise conditions. In an illustrative embodiment of the present invention, ALU 8 can be adapted to apply the same smoothing filter given by equation (16) to individual frame values. In an illustrative embodiment of the invention, FIG. 4 uses a smoothing factor of η=0.8. From FIG. 4 it can be seen that the combined metric M bears a substantially linear relationship to the optimum LMS step size parameter. In an illustrative embodiment of the present invention, ALU 8 can be adapted to carry out a linear approximation given by $$\mu = mM + b \quad (18)$$

where m is the slope and b is the y-intercept to derive the LMS step size parameter $\mu$ once the combined metric M is inserted into the equation. In an illustrative embodiment of the invention, the slope and y-intercept can be determined empirically by any reasonable technique known in the art. The solid line 1000 shown in FIG. 4 depicts a linear approximation. The values of $\mu$ derived from equation (18) are limited at the high and low ends to avoid unstable or extreme step size values. In the example just discussed, the estimated values for $\mu$ are constrained to the arbitrary range of:

$$0.05 \leq \mu \leq 0.9 \quad (19)$$

In an illustrative embodiment of the present invention, the step size estimation technique just discussed has been evaluated by measuring the BER of a coherent detection algorithm that uses the LMS algorithm for channel estimation. The BER performance of a transceiver using LMS estimated step size parameters based on a combined metric has been found to be almost identical to that obtained by using an optimum step size based on prior knowledge of an object's vehicle speed and the noise level within the channel.

It is to be understood that changes and variations may be made without departing from the spirit and scope of this invention as defined by the claims that follow.

I claim:

1. A method of improving the performance of a wireless device comprising:

generating a differential signal from successive samples of a received signal; and generating a SPEED metric from the differential signal, wherein the SPEED metric is further selected from the group consisting of the square of the absolute value of the magnitude of the mean value of the differential signal, the magnitude of the mean value of the differential signal and the square root of the magnitude of the mean value of the differential signal.

2. The method as in claim 1 further comprising generating a NOISE metric from a variance value of the differential signal.

3. The method as in claim 1 wherein the mean value comprises:

$$\overline{z}' = 1/N \sum_{k=1}^{N} z'_k.$$

4. The method as in claim 1 wherein the mean value comprises a limited number of known symbols.

5. The method as in claim 4 wherein the limited number of known symbols comprises 14 synchronization symbols making up an IS-136 standard signal.

6. The method as in claim 1 further comprising removing data modulation from the received signal.

7. The method as in claim 2 wherein the NOISE metric comprises a value which is approximately equal to twice the variance of noise in the received signal.

8. The method as in claim 2 wherein the NOISE metric is independent of the speed at which the wireless device is moving.

9. The method as in claim 2 wherein the variance value comprises a limited number of known symbols.

10. The method as in claim 9 wherein the limited number of symbols comprises 14 synchronization symbols making up an IS-136 standard signal.

11. The method as in claim 2 wherein the variance value comprises:

$$\sigma_z^{2'} = 1/N \sum_{k=1}^{N} |z'_k|^2 - |\overline{z}'|^2.$$

12. The method as in claim 2 wherein a logarithm of the ratio of the SPEED metric to the NOISE metric comprises a substantially linear relationship to an optimum LMS step size.

13. A method of improving the performance of a wireless device comprising:

generating a differential signal from successive samples of a received signal; and generating a NOISE metric from a variance value of the differential signal wherein the NOISE metric comprises a value which is approximately equal to twice the variance of noise in the received signal.

14. The method as in claim 3 wherein the NOISE metric is independent of the speed at which the wireless device is moving.

15. The method as in claim 13 wherein the variance value comprises a limited number of known symbols.

16. The method as in claim 15 wherein the limited number of symbols comprises 14 synchronization symbols making up an IS-136 standard signal.

17. The method as in claim 13 wherein the variance value comprises:

$$\sigma_z^{2\prime} = 1/N \sum_{k=1}^{N} |z'_k|^2 - |\bar{z}'|^2.$$

18. The method as in claim 13 wherein a logarithm of the ratio of a SPEED metric to the NOISE metric comprises a substantially linear relationship to an optimum LMS step size.

19. An ALU device for improving the performance of a wireless device comprising an arithmetic unit adapted to generate a differential signal from successive samples of a received signal and further adapted to generate a SPEED metric from a mean value of the differential signal, wherein the SPEED metric is further selected from the group consisting of the square of the absolute value of the magnitude of the mean value of the differential signal, the magnitude of the mean value of the differential signal and the square root of the magnitude of the mean value of the differential signal.

20. The device as in claim 19 wherein the ALU device is further adapted to generate a NOISE metric from a variance value of the differential signal.

21. The ALU device as in claim 19 wherein the mean value comprises:

$$\bar{Z}' = 1/N \sum_{k=1}^{N} Z'_k.$$

22. The ALU device as in claim 19 wherein the mean value comprises a limited number of known symbols.

23. The ALU device as in claim 22 wherein the limited number of symbols comprises 14 synchronization symbols making up an IS-136 standard signal.

24. The ALU device as in claim 19 wherein the device is further adapted to remove data modulation from the received signal.

25. The ALU device as in claim 20 wherein the NOISE metric comprises a value which is approximately equal to twice the variance of noise in the received signal.

26. The ALU device as in claim 20 wherein the NOISE metric is independent of the speed at which the wireless device is moving.

27. The ALU device as in claim 20 wherein the variance value comprises a limited number of known symbols.

28. The ALU device as in claim 27 wherein the limited number of symbols comprises 14 synchronization symbols making up an IS-136 standard signal.

29. The ALU device as in claim 20 wherein the variance value comprises:

$$\sigma_z^{2\prime} = 1/N \sum_{k=1}^{N} |z'_k|^2 - |\bar{z}'|^2.$$

30. The ALU device as in claim 20 wherein a logarithm of the ratio of the SPEED metric to the NOISE metric comprises a substantially linear relationship to an optimum LMS step size.

31. An ALU device for improving the performance of a wireless device comprising an arithmetic unit adapted to generate a differential signal from successive samples of a received signal and further adapted to generate a NOISE metric from a variance value of the differential signal, wherein the NOISE metric comprises a value which is approximately equal to twice the variance of noise in the received signal.

32. The ALU device as in claim 31 wherein the NOISE metric is independent of the speed at which the wireless device is moving.

33. The ALU device as in claim 31 wherein the variance value comprises a limited number of known symbols.

34. The ALU device as in claim 33 wherein the limited number of symbols comprises 14 synchronization symbols making up an IS-136 standard signal.

35. The ALU device as in claim 31 wherein the variance value comprises:

$$\sigma_z^{2\prime} = 1/N \sum_{k=1}^{N} |z'_k|^2 - |\bar{z}'|^2.$$

36. The ALU device as in claim 31 wherein a logarithm of the ratio of a SPEED metric to the NOISE metric comprises a substantially linear relationship to an optimum LMS step size.

37. A wireless device comprising an arithmetic logic unit adapted to generate a differential signal from successive samples of a received signal and further adapted to generate a SPEED metric from a mean value of the differential signal, wherein the SPEED metric is further selected from the group consisting of the square of the absolute value of the magnitude of the mean value of the differential signal, the magnitude of the mean value of the differential signal and the square root of the magnitude of the mean value of the differential signal.

38. The wireless device as in claim 37 wherein the arithmetic logic unit is further adapted to generate a NOISE metric from a variance value of the differential signal.

39. The wireless device as in claim 37 wherein the mean value comprises:

$$\bar{Z}' = 1/N \sum_{k=1}^{N} Z'_k.$$

40. The wireless device as in claim 37 wherein the mean value comprises a limited number of known symbols.

41. The wireless device as in claim 40 wherein the limited number of symbols comprises 14 synchronization symbols making up an IS-136 standard signal.

42. The wireless device as in claim 37 further comprises a receiver adapted to remove data modulation from the received signal.

43. The wireless device as in claim 38 wherein the NOISE metric comprises a value which is approximately equal to twice the variance of noise in the received signal.

44. The wireless device as in claim 38 wherein the NOISE metric is independent of the speed at which the wireless device is moving.

45. The wireless device as in claim 38 wherein the variance value comprises a limited number of known symbols.

46. The wireless device as in claim 45 wherein the limited number of symbols comprises 14 synchronization symbols making up an IS-136 standard signal.

47. The wireless device as in claim 38 wherein the variance value comprises:

$$\sigma_z^{2\prime} = 1/N \sum_{k=1}^{N} |z'_k|^2 - |\bar{z}'|^2.$$

48. The wireless device as in claim 38 wherein a logarithm of the ratio of the SPEED metric to the NOISE metric comprises a substantially linear relationship to an optimum LMS step size.

49. A wireless device comprising an arithmetic logic unit adapted to generate a differential signal from successive samples of a received signal and further adapted to generate a NOISE metric from a variance value of the differential signal, wherein the NOISE metric comprises a value which is approximately equal to twice the variance of noise in the received signal.

50. The wireless device as in claim 49 wherein the NOISE metric is independent of the speed at which the wireless device is moving.

51. The wireless device as in claim 49 wherein the variance value comprises a limited number of known symbols.

52. The wireless device as in claim 51 wherein the limited number of symbols comprises 14 synchronization symbols making up an IS-136 standard signal.

53. The wireless device as in claim 49 wherein the variance value comprises:

$$\sigma_z^{2\prime} = 1/N \sum_{k=1}^{N} |z'_k|^2 - |\bar{z}'|^2.$$

54. The wireless device as in claim 49 wherein a logarithm of the ratio of a SPEED metric to the NOISE metric comprises a substantially linear relationship to an optimum LMS step size.

* * * * *